United States Patent Office 3,652,720
Patented Mar. 28, 1972

---

3,652,720
BLENDS OF RUBBERY POLYMERS WITH BLOCK COPOLYMERS CONTAINING LACTONES
Roy F. Wright, Bartlesville, Okla., assignor to
Phillips Petroleum Company
No Drawing. Filed Jan. 30, 1970, Ser. No. 7,233
Int. Cl. C08f 29/12, 33/08, 37/18
U.S. Cl. 260—876 B                              10 Claims

ABSTRACT OF THE DISCLOSURE

The ozone resistance of rubbery polymers is greatly improved by blending therewith a block copolymer containing a lactone to provide a final blend that contains at least 9 weight percent lactone.

---

This invention relates to a process for improving the ozone resistance of rubbery polymers such as natural rubber, polyisoprene, polybutadiene, butadiene-styrene copolymers, SBR, and other conventional elastomeric polymers. This invention relates to a process for blending rubbery (elastomeric) polymers with block copolymers containing lactones. This invention further relates to a novel ozone resistant composition comprising at least 9 weight percent lactone and a rubbery polymer wherein said lactone is provided by a block copolymer containing said lactone.

A process has now been discovered for greatly improving the ozone resistance of rubbery polymers while essentially maintaining or improving other important properties of the rubbery polymer, such as tensile strength, elongation, and modulus. It has thus been discovered that by forming a blend that comprises a rubber and at least 9 weight percent lactone that the ozone resistance of the rubbery polymer is greatly enhanced if said lactone is in the form of a block copolymer containing said lactone in contrast to a polylactone such as a lactone homopolymer.

According to my invention conjugated diene-lactone block copolymers, containing from about 10 to 90 weight percent lactone, based on the total monomeric composition of said conjugated diene-lactone block copolymer, are employed to impart high ozone resistance to rubbery polymers by admixing said conjugated diene-lactone copolymer and said rubber to form a blend composite that contains at least 9 weight percent lactone, based on the total amount of polymers in said blend. My invention is particularly startling in view of the fact that it was found that a homopolymer of lactone, even at high concentrations, was ineffective to improve the ozone resistance of rubbery polymers. Thus it is completely unexpected that a lactone containing polymer could be used to improve the ozone resistance of rubbers, such as polymerized conjugated dienes which are themselves subject to ozone degradation, especially since said lactones are employed as a copolymer with a conjugated diene in accordance with this invention.

The conjugated diene-lactone block copolymers of this invention, which are employed to impart ozone resistance to rubbery polymers, can be broadly represented by the Formula A–B, wherein A represents a block or polymer segment comprising polymerized conjugated dienes and B represents a block or polymer segment comprising polymerized lactones. The B block comprises homopolymers of lactones or copolymers of two or more lactones and said lactone block or segment comprises about 10 to 90 weight percent of the total weight of said conjugated diene block copolymer. The A block thus comprises the remaining 90 to 10 weight percent of said conjugated diene block copolymer, and said A segment comprises homopolymer prepared from conjugated dienes, copolymers prepared from two or more conjugated dienes, or copolymers prepared from conjugated dienes and monovinylsubstituted aromatic hydrocarbons. When the A segment comprises a copolymer of conjugated dienes and monovinyl-substituted aromatic hydrocarbons it is preferred that sufficient conjugated diene monomer be employed to provide a minimum of 10 weight percent of polymerized conjugated diene based on the total weight of said conjugated diene block copolymer. When the A block is a copolymer of conjugated dienes and monovinyl-substituted aromatic hydrocarbons, these monomers can be combined in a random or block manner. Thus, for example, the lactone polymer segment B can be attached to block A at a polymerized diene segment or a polymerized monovinyl-substituted aromatic hydrocarbon segment.

Subject to the above limitations, the lactone containing block copolymers of this invention can be prepared by the preferred procedure that is disclosed in U.S. patent application Ser. No. 883,986, by Floyd E. Naylor, entitled Lactone Copolymers, filed December 10, 1969.

Said patent application is incorporated herein by reference thereto.

Any of the methods disclosed in said patent application for preparing lactone containing block copolymers can be employed according to this invention subject, of course, to any limitations herein set forth.

Conjugated dienes containing from about 4 to 12 carbon atoms per molecule and monovinyl-substituted aromatic hydrocarbons containing from about 8 to 12 carbon atoms per molecule can be employed for preparing the lactone-containing block polymers employed according to this invention.

Suitable conjugated dienes include 1,3-butadiene, isoprene, piperylene, 6-phenyl-1,3-hexadiene, and the like. Suitable monovinyl-substituted aromatic hydrocarbon compounds include styrene, alpha-methyl-styrene, 4-methylstyrene, 4-isopropylstyrene, 2,4-dimethylstyrene, 1-vinylnaphthalene, 2-vinylnaphthalene, alkyl derivatives thereof, and the like.

Lactone monomers that can be employed according to this invention in preparing said conjugated diene block copolymer containing said lactone are represented by the following formula:

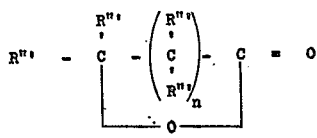

wherein R''' is one of hydrogen, alkyl, cycloalkyl, or aryl hydrocarbon radicals, and combinations thereof such as alkylaryl, wherein the total carbon atoms in the substituents, R''', being in the range of about 1 to 12, and wherein $n$ is an integer which can be 1, 3, or 4.

Exemplary of suitable lactones are beta-propiolactone, delta-valerolactone, episilon-caprolactone, and lactones corresponding to the following acids:

2-methyl-3-hydroxypropionic acid,
3-hydroxynonanoic or 3-hydroxypelargonic acid,
2-dodecyl-3-hydroxypropionic acid,
2-cyclopentyl-3-hydroxypropionic acid,
3-phenyl-3-hydroxypropionic acid,
2-naphthyl-3-hydroxypropionic acid,
2-n-butyl-3-cyclohexyl-3-hydroxypropionic acid,
2-phenyl-3-hydroxytridecanoic acid,
2-(2-methylcyclopentyl)-3-hydroxypropionic acid,
2-methylphenyl-3-hydroxypropionic acid,
3-benzyl-3-hydroxypropionic acid,
2,2-dimethyl-3-hydroxypropionic acid,
2-methyl-5-hydroxyvaleric acid,
3-cyclohexyl-5-hydroxyvaleric acid,
4-phenyl-5-hydroxyvaleric acid,
2-heptyl-4-cyclopentyl-5-hydroxyvaleric acid,
2-methyl-3-phenyl-5-hydroxyvaleric acid,
3-(2-cyclohexylethyl)-5-hydroxyvaleric acid,
2-(2-phenylethyl)-4-(4-cyclohexylbenzyl)-5-hydroxyvaleric acid,
4-benzyl-5-hydroxyvaleric acid,
3-ethyl-5-isopropyl-6-hydroxycaproic acid,
2-cyclopentyl-4-hexyl-6-hydroxycaproic acid,
3-phenyl-6-hydroxycaproic acid,
3-(3,5-diethylcyclohexyl)-5-ethyl-6-hydroxycaproic acid,
4-(3-phenylpropyl)-6-hydroxycaproic acid or
2-benzyl-5-isobutyl-7-hydroxycaproic acid As disclosed in said patent application by Naylor the preferred polymerization initiators of the foregoing monomers are the organoalkali metal polymerization initiators, more preferably, organolithium initiators. Representative of preferred polymerization initiators are methyllithium, isopropyllithium, n - butyllithium, tertiary - octyllithium, n-decyllithium, phenyllithium, 1-naphthyllithium, cyclohexyllithium, 4-butylcyclohexyllithium, dilithiomethane, 1,4-dilithiobutane, 1,10-dilithiodecane, 1,20-dilithioeicosane, and the like.

The polymerization procedures employing the above monomers and initiators are fully disclosed in said patent application and therefore are not in detail described here. The method and conditions suitable for the production of rubbery polymers are conventional, such as disclosed in British Pats. 817,693 and 888,624, as well as U.S. Pat. 2,975,160, their disclosures are herein incorporated by reference thereto.

Subject to the aforedescibed limitation, the blend composite can contain wide variations in the ratios of the various polymer components. The properties of the blend such as tensile strength, elongation, and impact strength can thus be varied by changing said ratios. It is preferred that the rubbery polymers comprise at least 50 weight percent of the blend but can be smaller or larger such as from 10 to 90 weight percent based on the total weight of the blend.

The blend of the conjugated diene block copolymer containing the lactone and the rubbery polymer can be prepared by any conventional method that provides an essentially homogeneous mixture. Suitable blending methods include milling such as on a roll mill, mixing in an internal mixer such as a Banbury mixer, or in a screw extruder, or other conventional method.

The rubbery (elastomeric) polymers that are blended with the lactone containing block copolymers according to this invention comprise essentially any polymeric material which if subjected to conventional vulcanization with sulfur or a sulfur-containing compound would exhibit reversible extensibility at 80° F. of at least 100 percent of the original length of the specimen with a retraction of at least 90 percent within one minute after release of the stress necessary to elongate the specimen to 100 percent. Summarily, the rubbery polymers of this invention comprise essentially those which are sulfur vulcanizable. By the term "sulfur vulcanizable" I mean a polymer containing at least two double bonds per 1000 carbon atoms in the polymer chain and/or branches thereof. A convenient method for determining the unsaturation of said rubbery polymers is the iodine chloride method which employs a 0.5 gram sample of polymer which is dissolved in a 75/25 volume mixture of carbon disulfide and chloroform. The chloroform solution of iodine chloride of known concentration (0.09 to 0.10 molar) is added to the polymer solution and the mixture is then placed in a 25° C. bath for 1 hour to allow time for reaction. Thereafter, the excess of iodine chloride is titrated with 0.05 normal sodium thiosulfate. The millimoles of iodine chloride that react one gram of sample is then calculated. A test is run using only solvent and iodine chloride and an appropriate conventional correction is made when calculating unsaturation of the polymer.

Exemplary conventional rubbery polymers are natural rubber, cis-polyisoprene, cis-polybutadiene, vinyl-polybutadiene, butadiene/styrene copolymers, butadiene/acrylonitrile copolymers, emulsion polymerized butadiene/styrene copolymers (SBR), and the like. The foregoing types of rubber polymers are those conventionally vulcanized in conventional process equipment employing conventional vulcanization agents and accelerators such as sulfur and sulfur-containing compounds such as N-oxydiethylene-2-benzothiozolesulfenamide. Other additives that can also be incorporated include antioxidants, pigments, softeners, fillers, and the like. The blends of the foregoing rubbers and the conjugated diene block copolymer containing the lactone of this invention can be compounded and vulcanized by conventional methods. It is important, however, that the temperature employed in the curing step should be below about 300° F., and preferably below about 270° F., in order to maintain good ozone resistance in said blend. Within the above-described temperature limits the time employed for said curing step should preferably not exceed about 45 minutes for the upper temperature limits but can at the lower temperatures be considerably greater such as long as several days at a cure of about 75° F. Thus, in general, the faster the curing recipe selected, the higher the temperature which can be employed in said curing step.

The foregoing rubbers which have been blended, cured, and processed as herein described can be employed in the production of tires, gaskets, belts, wire coating, hose, and the like, or in the manufacture of other articles wherein conventional rubbers can be employed.

The lactone-containing block copolymers of this invention can also be blended with other well known elastomeric polymers that exhibit sufficiently high raw tensile strengths that they can be employed for many uses in the uncured state. Linear block copolymers that contain non-elastomeric terminal segments and elastomeric central segments are exemplary. Radial block polymers characterized as having at least three polymer branches with each branch of the radial block polymer comprising terminal non-elastomeric segments and at least a second elastomeric segment joined thereto are other exemplary rubbers that can be employed according to this invention in the uncured state.

These linear block copolymers that can be employed according to this invention can be broadly depicted as a C–D–C type polymer. The polymers are characterized by containing three jointed segments, or blocks, wherein C represents a polymer segment or block exhibiting non-elastomeric properties and D represents a polymer segment or block that exhibits elastomeric properties.

The segments or blocks of the linear block polymer are jointed in an end-to-end arrangement through a primary chemical bond. Each polymeric segment or block can contain a sequence of monomeric units substantially of a single monomer and thus essentially comprise a homopolymer block or they can contain alternate segments or can be formed from mixtures of monomers and thus form a random copolymer block. The C block or segment contains from about 0 to 45 weight percent polymerized conjugated diene monomer containing from about 4 to 12 carbon atoms per molecule; and from about 55 to 100 weight percent polymerized monovinyl-substituted aromatic hydrocarbon monomer containing from about 8 to 12 carbon atoms per molecule, said weight percentage being based on the composition of each block C. Mixtures of conjugated dienes or of monovinyl-substituted aromatic hydrocarbons can, of course, be employed to prepare said C block.

The D block or segment contains from about 55 to 100 weight percent of said conjugated diene monomer and from about 0 to 45 weight percent of said monovinyl-substituted aromatic hydrocarbon based on the composition of said D block.

The amount of said D block is from about 60 to 90 weight percent of the total polymer composition with the remaining weight percent of the total polymer composition forming the C blocks. Each C block comprises at least 5 weight percent of the total polymer composition.

The rubbery linear block polymer which has been broadly characterized as a C–D–C type polymer can also be characterized as a C–D–Y–D–C type polymer when the method of preparation of said linear block polymer includes the addition of a polyfunctional treating agent. As in the C–D–C type polymer the C polymer segments are as herein defined before and the two D's collectively represent the middle elastomeric polymer block (D) and the Y being representative of an atom or group of atoms derived from a polyfunctional treating agent which contains only two functional groups per molecule and which effects the coupling of two C–D type living block polymers to produce a linear block copolymer containing the terminal non-elastomeric blocks and the middle elastomeric block.

Rubbery radial block polymers that can be employed according to this invention can be in a broad sense depicted as $(C-D)_xY$ type polymers wherein C represents non-elastomeric polymer blocks or segments and D represents the elastomeric polymer segments. Y is an atom or group of atoms derived from a polyfunctional treating agent used in the formation of the radial polymers and $x$ represents the number of functional groups of said polyfunctional treating agent and is an integer of at least 3.

The radial block polymers are thus characterized as having at least three polymer branches with each branch of the radial block polymer comprising the terminal non-elastomeric segments. The branches of the radial block polymer contain the terminal non-elastomeric segments and at least a second elastomeric polymer segment joined thereto. The composition of each C block or segment is the same as described above for said linear block copolymer. Likewise, the D blocks or segments collectively represent the (D) block of said linear block copolymer and collectively are as described for said D block in the linear block copolymer.

The amount of block D. which collectively is made up of the three or more segments linked together by the polyfunctional coupling agent, is from about 55 to 85 weight percent of the total polymer composition. The remaining weight percent of the total polymer composition is essentially present in the C blocks or segments. Each C block represents at least 5 weight percent of its total polymer composition.

The blends of the lactone-containing block copolymer of this invention and the lastly described radial and linear block copolymers have many uses such as in the formation of toys, rubber bands, cove-base moldings, shoe soles, mechanical goods, and the like. The aforedescribed blends can also be foamed and employed as rug underlay, shoe soles and the like. When employing these lastly described blends, although no curing step is employed, it is important that any processing steps, such as in the injection molding of these blends, should be carried out at temperatures of about 350° F. and below. Of course, the lower the temperature of said processing step, the longer the blend can be held at said temperature without detrimental effects to the desired ozone resistance.

The rubbery polymers employed according to this invention can be made by any conventional method. British Pat. 888,624, U.S. Pat. 3,215,679, issued to Trepka, Nov. 2, 1965; U.S. Pat. 3,458,492, issued to Farrar on July 29, 1969, U.S. Pat. 3,281,383, issued to Zelinski et al., Oct. 25, 1966; U.S. Pat. 3,287,333, issued to Zelinski, Nov. 22, 1966; and U.S. Pat. 3,251,905, issued to Zelinski, May 17, 1966 disclose other exemplary methods for preparing said rubbery polymers. Their disclosures are incorporated herein by reference thereto.

Ilustrative of the foregoing discussion and not to be interpreted as a limitation on the scope thereof, or on the materials herein employed, the following examples are presented.

EXAMPLE I

Runs were made to demonstrate the ability of a lactone polymer to improve the ozone resistance of a rubber if said lactone is employed as a block copolymer containing said lactone in contrast to a lactone homopolymer. Accordingly, in Run 1 of this example, a rubber was blended with a styrene/butadiene/epsilon-caprolactone (20/20/60) according to this invention. In Run 2 a rubber was blended with a polycaprolactone polymer to provide the equivalent percentage, as employed in Run 1, of lactone to the rubber blend. In Run 3 no lactone polymer was employed. The lactone homopolymer employed in Run 2 was manufactured by Union Carbide. The styrene/butadiene/epsilon caprolactone polymer employed in Run 1 was prepared according to the following recipe:

Polymerization recipe

| | Parts, by wt. |
|---|---|
| Step 1: | |
| Cyclohexane | 780 |
| Styrene | 20 |
| n-Butyllithium | 0.145 |
| Tetrahydrofuran (THF) | 0.05 |
| Time, hrs. | 0.5 |
| Temperature, ° F. | 158 |
| Step 2: | |
| 1,3-butadiene | 20 |
| Time, hrs. | 0.5 |
| Temperature, ° F. | 158 |
| Step 3: | |
| Epsilon-caprolactone | 60 |
| PAPI [1] | 0.393 |
| Time, hrs. | 0.8 |
| Temperature, ° F. | 194 |

[1] A polymethylene polyaryl polyisocyanate having about 3 isocyanate groups per molecule and a molecular weight of about 380.

Cyclohexane was charged to the reactor first and was heated to about 158° F. Styrene was added next followed by the THF and the sec-butyllithium. After the reaction period indicated, during which the styrene was essentially completely polymerized, the butadiene was added and polymerized essentially to completion during the indicated reaction. The epsilon-caprolactone was added followed immediately by the PAPI. After the reaction period indicated in Step 3, the solution was discharged into another vessel and stirred for about 5 minutes with a solution of 2,2′-methylene-bis-(4 - methyl - 6 - tert-butylphenol) in isopropyl alcohol in order to provide, in the recovered polymer, about one part by weight of the antioxidant per 100 parts by weight of the polymer. The copolymer was then separated and dried.

The rubber and lactone polymer (if employed) were compounded according to the following recipe:

|  | Parts, by weight | | |
|---|---|---|---|
| Run No | 1 | 2 | 3 |
| Rubber [1] | 67 | 80 | 100 |
| Styrene/butadiene/ε-caprolactone | 33 | | |
| Polycaprolactone | | 20 | |
| IRB #2 [2] | 30 | 30 | 30 |
| Zinc oxide | 5 | 5 | 5 |
| Cumar MH 2½ [3] | 15 | 15 | 15 |
| ZBX [4] | 8 | 8 | 8 |
| DBA [5] | 8 | 8 | 8 |
| Methyl tuads [6] | 0.5 | 0.5 | 0.5 |
| Sulfur | 6 | 6 | 6 |
| Caprolactone, percent in blend | 20 | 20 | 0 |

[1] Solprene 1205®, butadiene/styrene (75/25) block copolymer, containing about 18 wt. percent polystyrene, Mooney viscosity (ML-4, 212° F.) of about 45.
[2] Industry Reference Black No. 2-A high abrasion furnace black.
[3] Coumarone-indene resin composition; melting point 115-125° C.; maximum ash 0.590; sp. gr. 1.13.
[4] Zinc di(butylxanthate).
[5] Dibenzylamine.
[6] N, N, N', N'-tetramethyl thiuram disulfide.

The foregoing compounded blends were employed to prepare molded samples by pressing in molds for 10 minutes at 160° F. and tempered 72 hours at 80° F. The samples were tested to determine their ozone resistance as well as other important properties and the data are reported in Table I.

TABLE I

| Run No | 1 | 2 | 3 |
|---|---|---|---|
| 300 percent modulus, p.s.i. [1] | 1,260 | 1,080 | 1,390 |
| Tensile, p.s.i. [1] | 2,240 | 2,240 | 1,760 |
| Elongation, percent [1] | 640 | 690 | 440 |
| Tensile at 150° F., p.s.i. [1] | 800 | 730 | 840 |
| Ozone resistance: [2] | | | |
| Bent loop: | | | |
| 1 day | 0 | 8 | 10 |
| 7 days | 0 | Broke | Broke |
| 10% elongation: | | | |
| 1 day | 0 | 8 | 10 |
| 7 days | 0 | Broke | Broke |

[1] Determined according to ASTM D 412-66.
[2] Molded samples, bent 180° to form a loop, were exposed at 104° F. to circulating air containing 50±5 parts by weight ozone per 100 million. Rating is on a scale of 0 to 10, with 0 meaning no cracks, 10 meaning many large cracks, and X meaning that the sample broke. ASTM D 1149-64 modified in sample preparation and rating system.

The above example demonstrates the tremendous improvement in ozone resistance of a rubbery polymer when blended with a block copolymer containing the lactone according to this invention.

EXAMPLE II

A rubbery branched block copolymer, i.e., radial copolymer of butadiene/styrene (60/40) was prepared using the following recipe and conditions.

Polymerization recipe

|  | Parts, by weight |
|---|---|
| Cyclohexane | 800 |
| Styrene | 40 |
| 1,3-butadiene | 60 |
| n-Butyllithium | Variable |
| Oxiron 2000 [1] | 0.5 |

[1] Liquid epoxidized polybutadiene with a pale amber color, a viscosity of 800 poises at 25° C., a specific gravity of 1.01, an epoxy content of 9.0 percent (oxirane oxygen), and an epoxy equivalent of 177.

Cyclohexane was charged to the reactor first followed by the styrene and the n-butyllithium. The styrene monomer was polymerized to essential completion and the butadiene was added and the polymerization continued until essential completion. Oxiron 2000 was added to couple the living polymer segments and to form the radial copolymer. The rubbery radial block copolymer that was employed for testing purposes was a mixture of equal parts by weight of each of the following polymers. The following initiator levels and reaction conditions were employed in their preparation.

| Polymer | A | B | C |
|---|---|---|---|
| n-Butyllithium, parts per 100 per monomer | 0.12 | 0.11 | 0.10 |
| Initiation temperature, ° F | 162 | 158 | 153 |
| Styrene reaction time, hr | 0.4 | 0.4 | 0.5 |
| Butadiene addition temp., ° F | 176 | 172 | 167 |
| Butadiene reaction time, hrs | 0.9 | 0.75 | 1.0 |
| Oxiron addition temp., ° F | 215 | 211 | 206 |
| Oxiron reaction time, hrs | 1.9 | 1.25 | 1.5 |

At the end of the total reaction period 1.5 parts per hundred of rubber of 2,6-di-tert-butyl-4-methylphenol was added as an antioxidant, and the polymer was steam-stripped, washed, and dried. The radial block polymer mixture of equal parts by weight of each of the three batches was a polymer mixture composite that contained 37.4 weight percent total styrene and 38.5 percent polystyrene, and had a Mooney viscosity (MS-4, 275° F., ASTM D 1646-63) of 60.

The lactone-containing block polymer that was employed according to this invention was prepared according to the following recipe and addition order and comprises a styrene/butadiene/epsilon-caprolactone copolymer (20/20/60 weight ratio).

Polymerization recipe

Step 1: Parts, by wt.
    Cyclohexane _____ 780
    Styrene _____ 20
    sec-Butyllithium, mhm. [1] _____ 2.5
    Temperature, ° F. _____ 158
    Time, min. _____ 60
Step 2:
    1,3-butadiene _____ 20
    Temperature, ° F. _____ 158
    Time, min. _____ 90
Step 3:
    Ethylene oxide, mhm. _____ 8
    Epsilon-caprolactone _____ 60
    Temperature, ° F. _____ 158
    Time, hrs. _____ 24

[1] Gram millimoles per 100 grams of monomers.

In the foregoing preparation the reactor was purged with nitrogen after cyclohexane addition, and the reaction mixture was cooled to room temperature following each step. Following Step 3, about 1 weight percent 2,2'-methylene-bis(4-methyl-6-tert-butylphenol) was added as a 10 weight percent solution in 50/50 isopropyl alcohol/toluene (by volume). The polymer was then coagulated in isopropyl alcohol, separated, and dried. Blends containing the indicated percentages of the rubbery radial block polymer and the lactone-containing block copolymer were made by milling the two polymers on a 2-inch roll mill for 5 to 10 minutes at 330° F. Test samples were prepared by pressing in molds for 5 to 10 minutes at 250° F. The blends contained the indicated percentages of the two polymers. Properties of the various blends are reported in Table II.

TABLE II

| Polymer | Weight percent in blend | | | | | | | | |
| --- | --- | --- | --- | --- | --- | --- | --- | --- | --- |
| Radial block polymer | 100 | 95 | 90 | 85 | 80 | 75 | 50 | 25 | 0 |
| ε-Caprolactone, block copolymer | 0 | 5 | 10 | 15 | 20 | 25 | 50 | 75 | 100 |
| Percent lactone in blend | 0 | 3 | 6 | 9 | 12 | 15 | 30 | 45 | 60 |
| Tensile, p.s.i. at 80° F.[1] | 3,010 | 3,040 | 2,980 | 3,160 | 3,060 | 3,050 | 3,150 | 3,820 | 4,000 |
| Elongation, percent [1] | 880 | 880 | 890 | 850 | 870 | 820 | 660 | 650 | 620 |
| Ozone rating:[2] | | | | | | | | | |
| Bent loop: | | | | | | | | | |
| 1 day | 10 | 8 | 10 | 0 | 0 | 0 | 0 | 0 | 0 |
| 7 days | X | X | X | 0 | 0 | 0 | 0 | 0 | 0 |

[1] ASTM D412-66T.
[2] Molded samples, bent 180° to form a loop, were exposed at 104° F. to circulating air containing 50±5 parts by weight ozone per 100 million. Rating is on a scale of 0 to 10, with 0 meaning no cracks, 10 meaning many large cracks, and X meaning that the sample broke. ASTM D1149-64 modified in sample preparation and rating system.

The above example clearly demonstrates that by forming a blend that comprises a rubber and at least 9 weight percent lactone that the ozone resistance of the rubbery polymer is greatly enhanced if said lactone is in the form of a block copolymer.

EXAMPLE III

The rubbery radial block copolymer employed in Example II and hereafter labeled Polymer A and another rubbery radial polymer hereafter labeled Radial B were employed in blends with a styrene/butadiene/ε-caprolactone block copolymer (20/20/60) polymer.

Said radial polymer (B) was prepared according to the following polymerization recipe:

Polymerization recipe

Step 1: Parts, by wt.
Cyclohexane _____ 800
Styrene _____ 40
sec-Butyllithium _____ 0.13
Tetrahydrofuran (THF) _____ 1.5
Step 2:
1,3-butadiene _____ 60
Step 3:
Epoxol 9-5 [1] _____ 0.5
Temperature, °F. _____ 126-170
Time, hrs. (total) _____ 1.9
Conversion, percent _____ 100

[1] A product of Swift and Company. A polyepoxidized vegetable oil having a viscosity at 25° C. at 8.8 poises, a specific gravity of 1.020, and epoxy content of 9.0 percent (oxirane oxygen), saponification number of 176 (maximum), and a Gardner color less than 1. Averages over 5 epoxy groups per molecule.

According to the foregoing polymerization recipe the cyclohexane containing the THF was charged to the reactor first followed by the styrene and the sec-butyllithium. Polymerization was initiated at 126° F. and allowed to proceed adiabatically. After the styrene was essentially completely polymerized, the butadiene was added and polymerized. The coupling agent, Epoxol 9-5 was then added. The polymer was stabilized with 0.5 part by weight of 2,6-di-tert-butyl-4-methylphenol and 1.5 parts by weight of trisnonylphenylphosphite containing 1 percent triisopropanolamine, both expressed in terms of 100 parts by weight of polymer. The stabilized polymer was recovered by steam stripping of the polymer solution and the separated polymer was then dried in an extruder-expeller.

Said butadiene/styrene/ε-caprolactone block copolymer hereafter labeled Polymer D was prepared according to the following polymerization recipe:

Polymerization recipe

Step 1: Parts, by wt.
Cyclohexane _____ 468
Styrene _____ 20
sec-Butyllithium _____ 0.173
Time, hrs. _____ 1
Temperature, °F. _____ 158
Conversion, percent _____ 100
Step 2:
1,3-butadiene _____ 20
Time, hrs. _____ 1.5
Temperature, °F. _____ 158
Conversion, percent (total) _____ 100
Step 3:
Ethylene oxide _____ 0.352
Cyclohexane _____ 312
ε-Caprolactone _____ 60
Time, hrs. _____ 21.5
Temperature, °F. _____ 158
Conversion, percent (total) _____ 97

In accordance with the foregoing polymerization recipe the cyclohexane was charged to the reactor first and was then heated to 158° F. Styrene was added next followed by the sec-butyllithium. After a 1-hour reaction period, during which the styrene was essentially completely polymerized, the butadiene was added and polymerized essentially completely during a 1.5-hour reaction period. Ethylene oxide (10 percent by weight in cyclohexane) was added to the reaction mixture and allowed to react for about 3 minutes before additional cyclohexane and finally, the ε-caprolactone was added. After a 21.5-hour reaction period the mixture was discharged into another vessel and stirred for 10 minutes with a solution of 2,2'-methylene-bis-(4-methyl-6-tert-butylphenol) and isopropyl alcohol in order to provide, in the recovered polymer, about 1.5 parts by weight of the antioxidant per 100 parts by weight of the polymer. The polymer was separated and dried at 130° F.

The rubbery radial block polymers A and B were each blended with the lactone-containing block copolymer, polymer D. Blends were prepared by milling the polymers together on a 4 x 9-inch roll mill (4-inch diameter rolls)

at 280° F. for about 5 minutes. Test samples were then prepared by pressing slabs in cure molds at 300° F. for 10 minutes. Properties of the blends are reported in Table III.

TABLE III

| Run No. | Wt. percent A | Wt. percent B | Wt. percent D | Tensile[1] at 80° F., p.s.i. | Ozone rating[2] Bent loop | Time, days | 15% elongated |
|---|---|---|---|---|---|---|---|
| 1 | 100 | | | 2,320 | X | 1 | X |
|   |     |   |   |       | X | 4 | X |
|   |     |   |   |       | X | 8 | X |
| 2 | 80  |   | 20 | 2,550 | 0 | 1 | 0 |
|   |     |   |    |       | 0 | 4 | 10 |
|   |     |   |    |       | 0 | 8 | 10 |
| 3 | 60  |   | 40 | 2,620 | 0 | 1 | 0 |
|   |     |   |    |       | 0 | 4 | 0 |
|   |     |   |    |       | 0 | 8 | 0 |
|   |     |   |    |       | 0 | 7 | 0 |
| 4 | 50  |   | 50 | 2,480 | 0 | 1 | 0 |
|   |     |   |    |       | 0 | 4 | 0 |
|   |     |   |    |       | 0 | 8 | 0 |
| 5 |     | 100 |  | 3,210 | 9 | 1 | 8 |
|   |     |     |  |       | 10 | 4 | X |
|   |     |     |  |       | 10 | 8 | X |
| 6 |     | 60 | 40 | 3,160 | 0 | 1 | 0 |
|   |     |    |    |       | 0 | 4 | 0 |
|   |     |    |    |       | 0 | 8 | 0 |
| 7 |     |    | 100 | 1,660 | 0 | 1 | 0 |
|   |     |    |     |       | 0 | 4 | 0 |
|   |     |    |     |       | 0 | 8 | 0 |

[1] ASTM D 412–66T.
[2] Determined according to the procedure of Example I.

The above data demonstrate that the blends of this invention have tensile strength equal to or higher than the tensile strength of either the blend component alone. Furthermore, it is clearly demonstrated that blends of this invention have been demonstrated to have high ozone resistance.

EXAMPLE IV

Other blends were prepared according to this invention employing the rubbery radial block polymer labeled Polymer A, as was employed in Example III, in a typical uncured shoe sole stock recipe as shown below:

Compound recipe

| | Parts, by weight |
|---|---|
| Polymer A—rubbery radial | Variable |
| Lactone-containing polymer E [1] | Variable |
| HiSil 210 [2] | 20 |
| Dixie clay [3] | 20 |
| Cumar MH 2½ [4] | 10 |
| Iron oxide—yellow | 2 |
| Iron oxide—red | 0.5 |
| Cyanox SS [5] | 0.5 |
| Stearic acid | 2.0 |

[1] A styrene/butadiene/ε-caprolactone (20/20/60) block copolymer prepared in a manner essentially the same as that employed for the preparation of polymer D. Inherent viscosity 1.90; Mooney MS-4 at 275° F. 15; Melt Index at 180° C., 5 kg. load 4.68.
[2] Hydrated silica pigment of extremely fine particle size.
[3] A hard-type, white to cream colored kaolin; sp. gr. 2.60.
[4] Coumarone-indene resin composition; melting point 115–125° C.; maximum ash 0.5%; sp. gr. 1.13.
[5] 2,2'-methylene-bis(4-methyl-6-tert-butylphenol).

The above stocks were mixed on a 6 x 12-inch roll mill (6-inch diameter rolls) at 280° F. Samples were obtained from molten slabs pressed at 370° F. for 10 minutes. Properties of these stocks are reported in Table IV.

TABLE IV

| Run No. | Polymer A, parts | Polymer E, parts | NBS abrasion[1] rev./mil loss | Ozone[2] rating |
|---|---|---|---|---|
| 1 | 100 |     | 11  | 10 |
| 2 | 40  | 60  | 16  | 0 |
| 3 | 25  | 75  | 16  | 0 |
| 4 | 0   | 100 | 6.8 | 0 |

[1] ASTM D 1630-61 (modified by use of a 30 grid, number 2½ garnet abrasive).
[2] Bent loop method as described in Example I.

The above example demonstrates that the blends of this invention when compounded in a recipe such as above, have an abrasion resistance higher than either of the blend components alone while also maintaining the desired high ozone resistance.

As will be evident to those skilled in the art, various modifications of this invention can be made or followed in light of the discussion and disclosure herein set forth without departing from the scope or the spirit thereof.

I claim:

1. A process for improving the ozone resistance of rubbery polymer comprising blending with said rubbery polymer a block copolymer represented by the formula A–B wherein said A block represents from about 90–10 weight percent of the total weight of said block copolymer and comprises homopolymer prepared from conjugated dienes, copolymers prepared from two or more conjugated dienes, or copolymers prepared from conjugated dienes and monovinyl-substituted aromatic hydrocarbons wherein sufficient conjugated diene monomer is employed to provide a minimum of 10 weight percent of polymerized conjugated diene based on the total weight of said block copolymer, said conjugated dienes containing from 4–12 carbon atoms per molecule and said monovinyl-substituted aromatic hydrocarbons containing from 8–12 carbon atoms per molecule; and wherein said B block represents from about 10–90 weight percent of the total weight of said block copolymer and comprises a homopolymer or copolymer of a polymerized lactone monomer represented by the formula

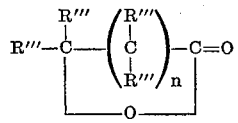

wherein R''' is one of hydrogen, alkyl, cycloalkyl or aryl hydrocarbon radicals, wherein the total carbon atoms in the substituents R''' are in the range of 1 to 12, and wherein n is an integer which can be 1, 3 or 4, to form a blend wherein said block copolymer is employed in an amount sufficient to provide in said blend at least 9 weight percent thereof said polymerized lactone.

2. The process according to claim 1 wherein said rubbery polymers when subjected to conventional vulcanization with sulfur or sulfur-containing compounds would exhibit reversible extendability at 80° F. of at least 100 percent of the original length of the specimen with a retraction of at least 90 percent within one minute after release of a stress necessary to elongate the specimen to 100 percent.

3. The process according to claim 2 wherein said rubbery polymer is selected from natural rubber, cis-polyisoprene, cis-polybutadiene, vinyl-polybutadiene, butadiene/styrene copolymers, or butadiene/acrylonitrile copolymers.

4. The process according to claim 2 wherein said rubbery polymer is selected from linear block copolymers that contain non-elastomer terminal segments and elastomeric central segments, or radial block copolymers characterized as having at least three polymer branches with each branch of the radial block polymer comprising terminal non-elastomeric segments and at least a second elastomeric segment joined thereto; wherein said linear block copolymer can be represented as a C–D–C type polymer wherein C represents a polymer segment exhibiting non-elastomeric properties and D represents a polymer segment exhibiting elastomeric properties, and wherein said C block contains from about 0 to 45 weight percent polymerized conjugated diene monomer containing from about 4 to 12 carbon atoms per molecule and from about 55 to 100 weight percent polymerized monovinyl-substituted aromatic hydrocarbon monomer containing from about 8 to 12 carbon atoms per molecule, said weight percentage based on the composition of each block C; wherein each said block C comprises at least 5 weight percent of the total polymer composition; and wherein said D block comprises from about 55 to 100 weight percent of said conjugated diene monomer and from about 0 to 45 weight percent of said monovinyl-substituted aromatic hydrocarbon monomer based on the composition of said D block; wherein the amount of said D block is from about 60 to 90 weight percent of the total polymer composition; wherein said rubbery radial block copolymer can be represented according to the following formula (C–D)$_x$Y type polymers wherein C represents non-elastomeric polymer blocks and D represents elastomeric polymer blocks, Y is an atom or group of atom groups derived from a polyfunctional treating agent using the formation of the radial polymers and $x$ represents the number of functional groups of said polyfunctional treating agent and is an integer of at least 3; wherein the composition of each C block is as described above for said linear block copolymer and the composition of said D blocks are collectively as described for said D block of said linear block copolymer; wherein said D blocks collectively comprise from about 55 to 85 percent by weight of the total polymer composition; and wherein each of said C blocks represent at least 5 weight percent of the total polymer composition.

5. The process according to claim 4 wherein said block copolymer containing the polymerized lactone is styrene/butadiene/epsilon-caprolactone (20/20/60).

6. The process according to claim 5 wherein said rubbery polymer is a rubbery radial block polymer.

7. The process according to claim 5 wherein said rubbery polymer is a rubbery linear block copolymer of butadiene and styrene.

8. A composition comprising rubbery polymer and a block copolymer, said block copolymer being represented by the formula A–B, wherein said A block represents from about 90–10 weight percent of the total weight of said block copolymer and comprises homopolymer prepared from conjugated dienes, copolymers prepared from two or more conjugated dienes, or copolymers prepared from conjugated dienes and monovinyl-substituted aromatic hydrocarbons wherein sufficient conjugated diene monomer is employed to provide a minimum of 10 weight percent of polymerized conjugated diene based on the total weight of said block copolymer, wherein said conjugated dienes contain from 4–12 carbon atoms per molecule and said monovinyl-substituted aromatic hydrocarbons contain from 8–12 carbon atoms per molecule and wherein said B block represents from about 10–90 weight percent of the total weight of said block copolymer and comprises a homopolymer or copolymer of polymerized lactone monomers represented by the formula

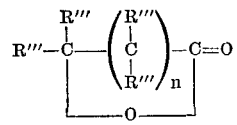

wherein R''' is one of hydrogen, alkyl, cycloalkyl or aryl hydrocarbon radicals, wherein the total carbon atoms in the substituents R''' are in the range of 1 to 12, and wherein $n$ is an integer which can be 1, 3 or 4, said blend being further characterized by having a sufficient amount of said block copolymer to provide at least 9 weight percent polymerized lactone in the overall composition.

9. A composition according to claim 8 wherein said rubbery polymer comprises at least 50 weight percent of said composition and is selected from natural rubber, cis-polyisoprene, cis-polybutadiene, vinyl-polybutadiene, butadiene/styrene copolymers, or butadiene/acrylonitrile copolymers.

10. A composition according to claim 8 wherein said rubbery polymer is selected from linear block copolymers that contain non-elastomeric terminal segments and elastomeric central segments, or radial block copolymers characterized as having at least three polymer branches with each branch of the radial block polymer comprising terminal non-elastomeric segments and at least a second elastomeric segment joined thereto; wherein said linear block copolymer can be represented as a C–D–C type polymer wherein C represents a polymer segment exhibiting non-elastomeric properties and D represents a polymer segment exhibiting elastomeric properties, and wherein said C block contains from about 0 to 45 weight percent polymerized conjugated diene monomer containing from about 4 to 12 carbon atoms per molecule and from about 55 to 100 weight percent polymerized monovinyl-substituted aromatic hydrocarbon monomer containing from about 8 to 12 carbon atoms per molecule, said weight percentage based on the composition of each block C; wherein each said block C comprises at least 5 weight percent of the total rubbery polymer composition; and wherein said D block comprises from about 55 to 100 weight percent of said conjugated diene monomer and from about 0 to 45 weight percent of said monovinyl-substituted aromatic hydrocarbon monomer based on the composition of said D block; wherein the amount of said D block is from about 60 to 90 weight percent of the total rubbery polymer composition; wherein said rubbery radial block copolymer can be represented according to the following formula (C–D)$_x$Y type polymers wherein C represents non-elastomeric polymer blocks and D represents elastomeric polymer blocks, Y is an atom or group of atoms derived from a polyfunctional treating agent used in the formation of the radial polymers and $x$ represents the number of functional groups of said polyfunctional treating agent and is an integer of at least 3; wherein the composition of each C block is as described above for said linear block copolymer and the composition of said D blocks are collectively as described for said D block of said linear block copolymer; wherein said D blocks collectively comprise from about 55 to 85 percent by weight of the total rubbery polymer composition; and wherein each of said C blocks represents at least 5 weight percent of the total rubbery polymer composition.

References Cited
UNITED STATES PATENTS 3,557,252  1/1971  Hsieh et al. _____ 260—876

SAMUEL H. BLECH, Primary Examiner

U.S. Cl. X.R.

260—2.5 R, 5, 41.5 A, 829, 836, 880, 887, 894